(12) United States Patent
Rukavina et al.

(10) Patent No.: US 7,248,392 B2
(45) Date of Patent: *Jul. 24, 2007

(54) VISION PANEL HAVING A MULTI-LAYER PRIMER

(75) Inventors: Thomas G. Rukavina, New Kensington, PA (US); Robert M. Hunia, Kittanning, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/472,331

(22) Filed: Jun. 22, 2006

(65) Prior Publication Data

US 2007/0002421 A1    Jan. 4, 2007

Related U.S. Application Data

(60) Provisional application No. 60/696,066, filed on Jul. 1, 2005.

(51) Int. Cl.
*G02F 1/153* (2006.01)

(52) U.S. Cl. .................. 359/275; 359/601; 359/614; 359/265

(58) Field of Classification Search ............. 359/601, 359/614, 265, 275
See application file for complete search history.

(56) References Cited

U.S. PATENT DOCUMENTS

| | | | |
|---|---|---|---|
| 5,202,787 A | 4/1993 | Byker et al. | |
| 5,471,554 A | 11/1995 | Rukavina et al. | |
| 5,805,330 A | 9/1998 | Byker et al. | |
| 5,821,001 A | 10/1998 | Arbab et al. | |
| 5,965,853 A | 10/1999 | Hornsey | |
| 6,064,509 A | 5/2000 | Tonar et al. | |
| 6,157,480 A | * 12/2000 | Anderson et al. | ........... 359/275 |

(Continued)

FOREIGN PATENT DOCUMENTS

EP    0 611 213 B1    8/1997

(Continued)

OTHER PUBLICATIONS

Rukavina, Thomas, U.S. Appl. No. 11/472,330, entitiled Electrochromic Vision Panel Having a Pluraliy Of Connectors, filed Jun. 22, 2006.

(Continued)

*Primary Examiner*—Evelyn A. Lester
(74) *Attorney, Agent, or Firm*—Andrew C. Siminerio (57) ABSTRACT

An electrochromic window includes a first transparent, e.g., plastic, substrate having a first primer over at least a portion thereof and a first electrically conductive coating over at least a portion of the first primer. A second transparent plastic substrate has a second primer over at least a portion thereof and a second electrically conductive coating over at least a portion of the second primer. The first primer has a coefficient of expansion less than the coefficient of expansion of the first plastic substrate, and the second primer has a coefficient of expansion less than the coefficient of expansion of the second plastic substrate. An electrochromic medium is located between the first and second electrically conductive coatings. At least one of the first and second electrically conductive coatings has a metal layer located between first and second metal oxide layers.

25 Claims, 3 Drawing Sheets

U.S. PATENT DOCUMENTS

| | | |
|---|---|---|
| 6,398,925 B1 | 6/2002 | Arbab et al. |
| 6,471,360 B2 | 10/2002 | Rukavina et al. |
| 6,643,050 B2 | 11/2003 | Rukavina et al. |
| 6,667,825 B2 | 12/2003 | Lu et al. |
| 6,700,692 B2 * | 3/2004 | Tonar et al. ............... 359/265 |
| 6,747,779 B1 | 6/2004 | Morin et al. |
| 6,828,062 B2 | 12/2004 | Lu et al. |
| 2004/0032638 A1 | 2/2004 | Tonar et al. |

FOREIGN PATENT DOCUMENTS

| | | |
|---|---|---|
| EP | 0 678 484 B1 | 6/1999 |
| EP | 0 718 200 B1 | 3/2000 |
| WO | WO 03/012541 A2 | 2/2003 |

OTHER PUBLICATIONS

O'Shaughnessy, U.S. Appl. No. 11/11/472,334, entitled "Transparent Electrode For An Electrochrom Switchable," filed Jun. 22, 2006.

Martin, Peter M., Guides To Vacuum Processing, "Electrochromic Thin Films", *Vacuum Technology & Coating*, Aug. 2005, pp. 28-30.

Minami et al, "Highly Transparent And Conductive Zinc-Stannate Thin Films Prepared By RF Magnetron Sputtering", *Japanese Journal of Applied Physics*, vol. 33 (1994) pp. L1693-L1696.

Enoki et al, "The Electrical And Optical Properties Of The ZnO-$SnO_2$ Thin Films Prepared By R.F. Magnetron Sputtering", Department of Materials Processing, Faculty of Engineering, Tohoku University, Sendai, 1992.

Enoki et al, "The Electrical And Optical Properties Of The ZnO-Doped $CdO-SnO_2$ Films Prepared By R.F. Magnetron Sputtering", Department of Materials Processing, Faculty of Engineering, Tohoku University, Sendai, 1993.

Kluth et al, "Magnetron Sputtered Zinc Stannate Films For Silicon Thin Film Solar Cells", $3^{rd}$ *World Conference On Photovoltaic Energy Conversion*, May 11-18, 2003, Osaka, Japan, pp. 1800-1803.

\* cited by examiner

VISION PANEL HAVING A MULTI-LAYER PRIMER

CROSS-REFERENCE TO RELATED APPLICATIONS

This application claims the benefits of U.S. application No. 60/696,066, filed Jul. 1, 2005, entitled "Multi-layer Coating/Primer Basecoats for Plasma Vapor Deposited Hard Coatings". This application is related to U.S. published application No. 2007/0002420 A1 entitled "An Electrochromic Vision Panel Having a Plurality of Connectors," and to U.S. Published Application No. 2007/0002422 A1 entitled "Transparent Electrode for an Electrochromic Switchable Cell," both filed concurrently herewith. These applications are herein incorporated by reference in their entirety.

BACKGROUND OF THE INVENTION

1. Field of the Invention

The present invention relates to switchable electrochromic devices that are capable of uniform switching throughout the entire structure. More particularly, the present invention is directed to switchable electrochromic devices, specifically aircraft window transparencies, which can uniformly switch between an activated and an unactivated state.

2. Technical Considerations

Commercial electrochromic devices are known in the art for use as transparencies, such as automotive windows, automobile mirrors, aircraft window assemblies, sunroofs, skylights, and architectural windows. Such electrochromic devices typically include a sealed chamber defined by two pieces of glass that are separated by a gap or space that contains an electrochromic medium. The electrochromic medium typically includes anodic compounds and cathodic compounds together in a solution. The glass substrates typically include transparent electrically conductive layers coated on facing surfaces of the glass and in contact with the electrochromic medium. The conductive layers on both glass substrates are connected to electronic circuitry. When the conductive layers are electrically energized, an applied potential is introduced into the chamber of the device, which electrically energizes the electrochromic medium and causes the medium to change color. For example, when the electrochromic medium is energized, it can darken and begin to absorb light.

Presently available coated transparencies typically contain one or more metal or metal oxide coatings, such as but not limited to silver, gold, tin oxide, indium tin oxide (ITO), fluorine doped tin oxide (FTO), antimony doped tin oxide, and ITO/metal/ITO (IMI), as the conductive coating on glass substrates. Electrochromic devices preferably have a sheet resistance on the order of 2 ohms per square for more rapid switching. However, 2 ohms per square of presently available conductive coatings, such as ITO, has an undesirable thickness and provides for decreased light transmittance. Excessive thickness of the conductive coating can result in buckling and subsequent separation of the conductive coating from the substrate surface, which can lead to costly repairs, or replacement, of the device. Therefore, it would be advantages to provide electrically conductive metal or metal oxide coatings for electrochromic devices that do not have the above problems.

In a conventional electrochromic window, a primer layer is typically provided on the glass substrate to improve the adhesion between the glass and the subsequently applied conductive coating, e.g. ITO. However, glass can crack and increases the weight of the electrochromic device. It would be desirable, therefore to utilize lighter weight materials, such as plastics, to replace the glass substrates of conventional electrochromic window to provide electrochromic devices that are lightweight, relatively inexpensive and durable. However, one problem associated with plastic substrates is that plastic has a larger coefficient of expansion than glass. Thus, primers used with glass substrates have a tendency to crack and break when placed on plastic substrates due to compressive and expansive stresses.

As can now be appreciated, it would be desirable to provide a primer coating that could be utilized on a plastic substrate of an electrochromic device to improve the adhesion between the plastic and the subsequently applied conductive coating, e.g. ITO.

SUMMARY OF THE INVENTION

An electrochromic window comprises a first transparent substrate having a first electrically conductive coating over at least a portion thereof and a plastic second transparent substrate having a second electrically conductive coating over at least a portion thereof. At least the second electrically-conductive coating comprises a metal layer between first and second metal oxide layers. An electrochromic medium is located between the first and second electrically-conductive coatings. The second substrate includes a multi-layer primer located between the second plastic substrate and the second electrically conductive coating.

Another electrochromic window comprises a first transparent plastic substrate having a first primer layer over at least a portion thereof and a first electrically conductive coating over at least a portion of said first primer layer. The first primer layer comprises a multi-film coating having a first primer film with a coefficient of expansion less than that of the first substrate and a second primer film having a coefficient of expansion less than that of the first primer film. The window further comprises a second transparent plastic substrate having a second primer layer over at least a portion thereof and a second electrically conductive coating over at least a portion of said second primer layer. The second primer layer comprises a multi-film coating having a first primer film with a coefficient of expansion less than that of the second substrate and a second primer film having a coefficient of expansion less than that of the first primer film. An electrochromic medium is located between the first and second conductive coatings, the electrochromic medium comprising a viologen dye and a dimethylphenazine dye. The electrically-conductive coatings comprise at least one metallic silver layer. In one nonlimiting embodiment of the invention, the electrically conductive coatings comprise two metallic silver layers or three metallic silver layers.

Another electrochromic window comprises a first transparent plastic substrate having a first multi-layer primer over at least a portion thereof and a first electrically conductive coating over at least a portion of the first primer. A second transparent plastic substrate has a second multi-layer primer over at least a portion thereof and a second electrically conductive coating over at least a portion of the second primer. The first primer layer has a coefficient of expansion less than the coefficient of expansion of the first plastic substrate, and the second primer layer has a coefficient of expansion less than the coefficient of expansion of the second plastic substrate. An electrochromic medium is located between the first and second conductive coatings, wherein at least one of the first and second conductive coatings comprises a metal layer located between first and second metal oxide layers.

BRIEF DESCRIPTION OF THE DRAWINGS

The foregoing summary, as well as the following detailed description of embodiments of the invention, will be better understood when read in conjunction with the appended drawings, wherein like reference numbers identify like parts throughout. In the drawings.

DETAILED DESCRIPTION OF THE INVENTION

For the purposes of this specification, unless otherwise indicated, all numbers expressing quantities such as dimensions, voltages, luminous transmittance, performance measurements and so forth used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used herein, the term "film" refers to a coating region of a desired or selected coating composition. The coating composition can be substantially uniform or nonuniform. A "layer" can comprise one or more "films" and a "coating" or "coating stack" can comprise one or more "layers". Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 6.1, 3.5 to 7.8, 5.5 to 10, etc.

In one non-limiting embodiment, the present invention is directed to switchable electrochromic window assemblies capable of having substantially uniform switching, or coloring, throughout the entire structure and which are capable of graded shading (i.e. gradient shading) or preferentially shading selected areas. In one non-limiting embodiment of the invention, the electrochromic window assembly includes a first transparent substrate coated with a first electrically conductive coating and a second transparent substrate coated with a second electrically conductive coating. The first and second transparent substrates are spaced, with the first and second conductive coatings facing each other. An electrochromic medium, which is capable of reduced light transmittance upon application of an electrical potential through the medium, is between and in electrical contact with the medium. In one non-limiting embodiment of the invention, the first and second transparent substrates are spaced to provide a chamber to contain the medium. In another non-limiting embodiment of the invention, a plurality of first spaced electrically connecting facilities is in contact with the first conductive coating, e.g. along opposing ends of the first substrate, for providing electrical current thereto, and a plurality of second spaced electrically conducting facilities is in contact with the second conductive coating, e.g. along opposing ends of the second substrate, for providing electrical current thereto. When current from a DC power source is applied to the first plurality and second plurality of facilities, an electrical potential is impressed between the coatings and through the electrochromic medium such that the electrochromic medium rapidly and uniformly changes between states, e.g. from the activate state to the unactivated state, e.g. changes from an undesired color to a desired color, due to the arrangement of the facilities. Moreover, the current can be applied to selected ones of the first and second plurality of facilities and shorted to other selected ones of the first and second plurality of facilities, thereby producing a window assembly including a shaded area in a selected portion of the assembly.

Shown in FIGS. 1-7 is an electrochromic window assembly 10 incorporating features of the invention. Although not required, in one particular non-limiting embodiment of the invention, the electrochromic window assembly 10 has a generally symmetrical geometry. For example, the electrochromic window assembly 10 can be a square or rectangular shaped window assembly. Such symmetrical shaped window assemblies are particularly useful as windows for aircraft such as cabin windows or cockpit windows, but are not required. The size and shape of the electrochromic window assembly 10 can be selected according to the particular desired use of the assembly.

Figure 1:
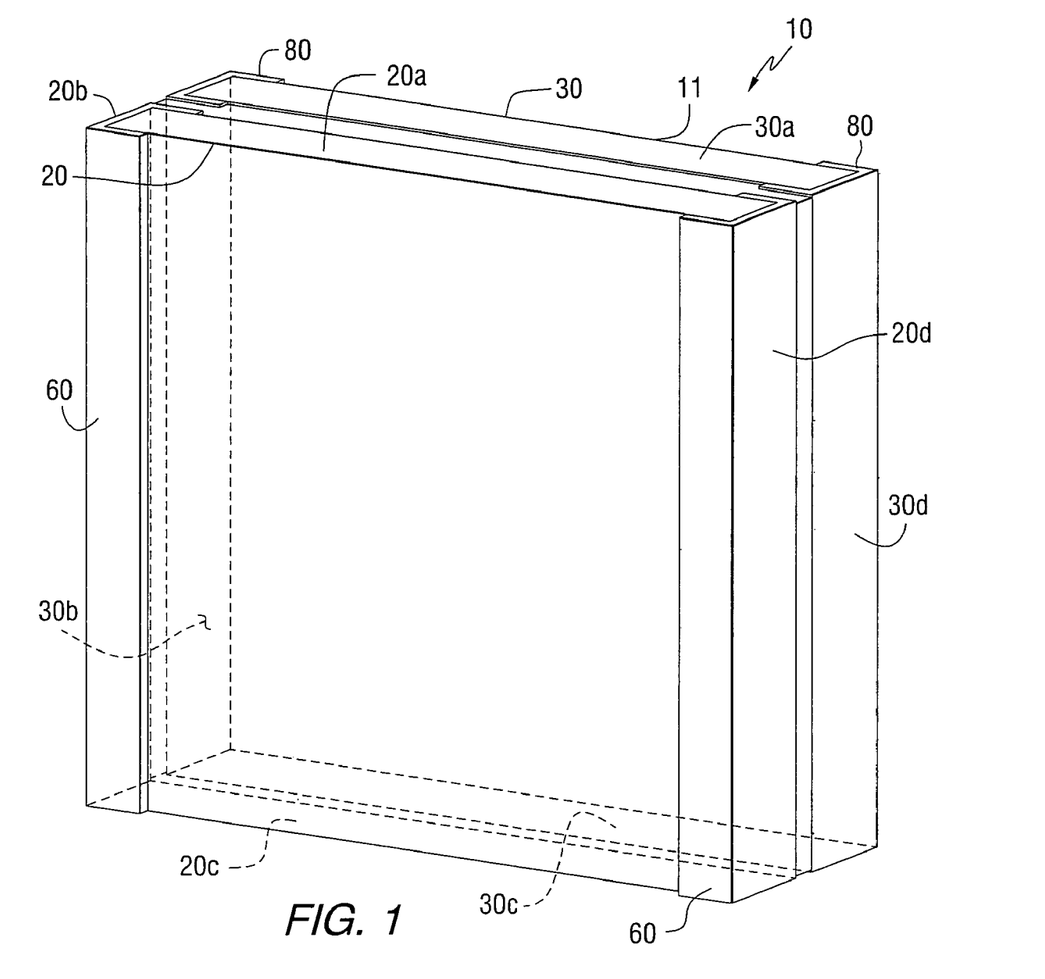
FIG. 1 is an orthogonal view of an embodiment of an electrochromic window assembly incorporating features of the present invention.
Figure 2:
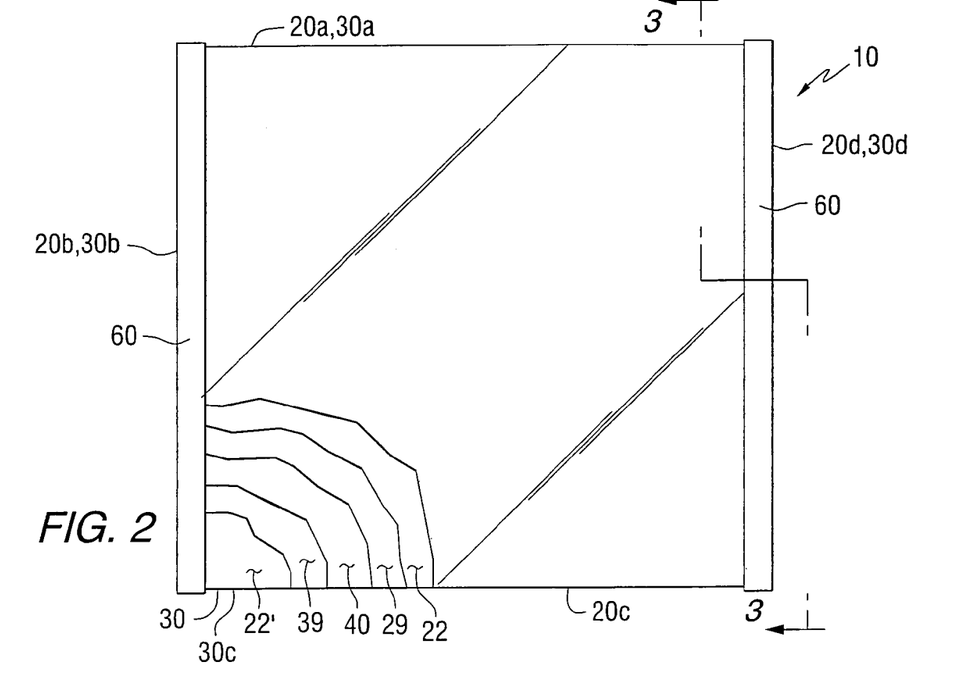
FIG. 2 is a front view of the electrochromic window assembly shown in FIG. 1 having portions removed for purposes of clarity.

As shown particularly in FIGS. 1 and 2, the electrochromic window assembly 10 includes a first transparent substrate 20 and a second transparent substrate 30. Such substrates can be made of any material known in the art for use in electrochromic devices, such as but not limited to polymeric materials, glass, and the like, and combinations of such materials. In non-limiting embodiments of the present invention, at least one or both of substrates 20 and 30 are made of plastic, for example, polycarbonate acrylic, urethane plastics and the like, and combinations of such materials. The first substrate 20 and second substrate 30 are both transparent. In addition, but not required, one or both substrates 20 and 30 can be colored or tinted. In one non-limiting embodiment of the present invention, the window assembly 10 has a luminous transmittance of at least 70% when in its uncolored or "bleached" state, as will be discussed later in more detail. As used herein, the terms "luminous transmittance" and "light transmittance" mean the measure of the total amount of visible light transmitted through a transparency. As used herein, "visible light" means electromagnetic radiation having a wavelength in the range of 380 nm to 800 nm. The luminous transmittance data provided in this specification is measured for CIE standard illuminant A and indicted as LTA.

Figure 3:
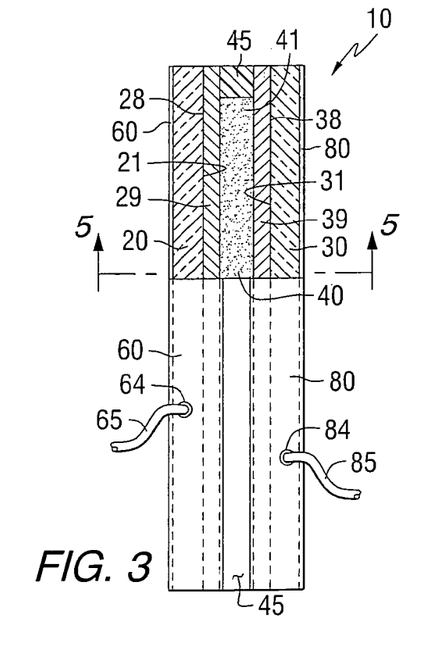
FIG. 3 is a sectional view of the electrochromic window assembly taken along line 3-3 of FIG. 2.
Figure 5:
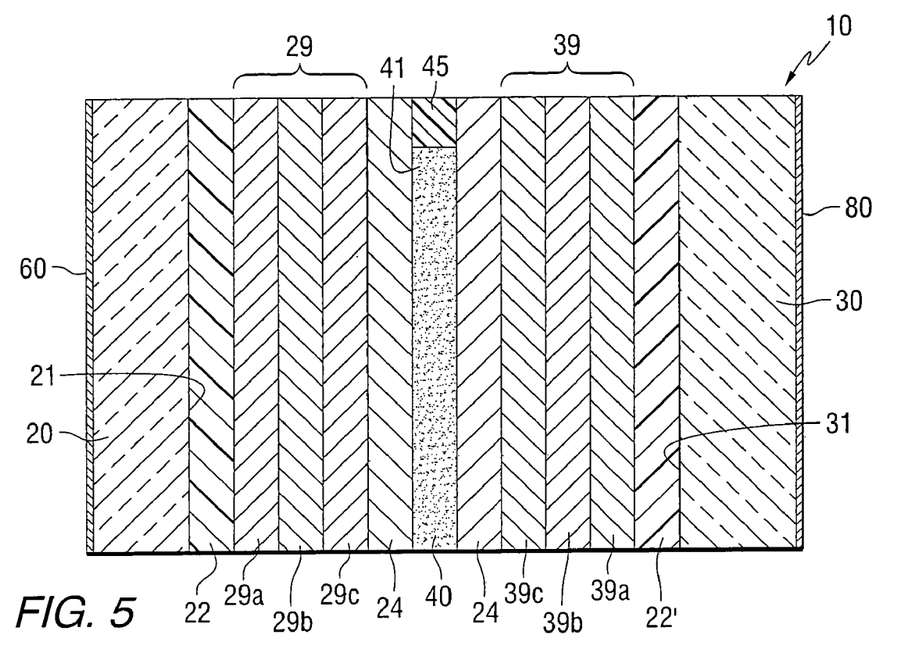
FIG. 5 is a sectional view of the electrochromic window assembly taken along line 5-5 of FIG. 3.

As shown in FIG. 3, the first substrate 20 and second substrate 30 are spaced apart and in a substantially parallel facing relationship with respect to each other, defining a chamber 41 therebetween. Such a relationship can be achieved through spacing element 45. Spacing element 45 can be positioned in any manner capable of maintaining desired spacing between first substrate 20 and second substrate 30. As shown in FIG. 5, the first substrate 20 and second substrate 30 may contain a primer layer 22, 22' on facing major surface 21 and facing major surface 31, respectively. In one non-limiting embodiment of the invention, spacing element 45 extends about the perimeter of electrochromic window assembly 10 adjacent the outer edges of first substrate 20 and second substrate 30 in a sealing manner, as is known in the art. Although not required, spacing element 45 can be positioned slightly inward from the outer edges of first substrate 20 and second substrate 30. Such positioning provides a slight overhang of the first and second substrates, which can expose a portion of first and second coatings 29 and 39, discussed below, for improved electrical contact. Spacing element 45 can be constructed of any non-electrically-conductive material. In one non-limiting embodiment of the invention, element 45 is a polymeric material, e.g. curable organic polymeric materials, such as but not limited to a thermoplastic material, thermosetting material, UV curing resin material, and combinations thereof. Epoxy based organic sealing materials are useful as sealing element 45.

Referring to FIGS. 1 and 2, the perimeter of first substrate 20 defines opposing ends 20a and 20c, which are opposite each other, as well as opposing ends 20b and 20d, which are opposite each other. Similarly, second substrate 30 includes opposing ends 30a and 30c, as well as opposing ends 30b and 30d.

Referring to FIG. 3, first substrate 20 and second substrate 30 are each provided with a layer of a transparent electrically-conductive material in the form of first conductive coating 29 and second conductive coating 39, respectively, on facing major surfaces 21 and 31 of the substrates 20 and 30, respectively. First and second conductive coatings 29 and 39 can be any material that is substantially transparent to visible light, is resistant to corrosion by any materials within the electrochromic device as well as the atmosphere, and has good electrical conductance. Although not required, coatings 29 and 39 typically include one or more metal or metal oxide coatings such as but not limited to silver, gold, tin oxide, indium tin oxide (ITO), fluorine doped tin oxide (FTO), antimony doped tin oxide, ITO/metal/ITO (IMI), as well as any other materials known in the art. In one non-limiting embodiment, the conductive coatings 29 and 39 are multiple-layered coatings comprising an ITO/silver/ITO arrangement. Conductive coatings 29 and 39 can be applied by any of several well known methods, including pyrolysis, chemical vapor deposition and magnetron sputtering. First and second conductive coatings 29 and 39 can be constructed from the same or different materials.

In one non-limiting embodiment of the invention, first and second conductive coatings 29 and 39 have a sheet resistance ranging from 1 to 10 ohms per square, e.g. ranging from 2 to 5 ohms per square. Further, the thickness of first and second conductive coatings 29 and 39 can be the same or different relative to each other and the coating thickness can be uniform, i.e. the same general thickness throughout, or non-uniform, i.e. the coating thickness varies. In one non-limiting embodiment of the present invention, the coatings have the same generally uniform thickness, ranging from 5,000 Å to 50,000 Å, e.g. from 13,000 Å to 26,000 Å.

As shown in FIG. 3, electrochromic medium 40 is contained within the chamber 41 formed between first substrate 20 and second substrate 30. In one non-limiting embodiment, the chamber 41 is from 15 to 20 mm thick. Electrochromic medium 40 can be any type of material as is known in the art, and can be in any known form, such as but not limited to electrochromic solutions, gels, semi-solid materials, and the like. Electrochromic medium 40 includes at least one electrochromic compound or dye that defines a color. Such materials are well known in the art to color to successively darker colors or shades as a larger electrical potential is applied. When the potential is turned off or reversed, the coloring is removed or bleached, allowing transmittance of light through electrochromic medium 40 to the same extent as before the potential was applied. In one non-limiting embodiment, the electrochromic medium comprises a viologen dye and a dimethylphenazine dye.

In one non-limiting embodiment of the present invention, electrochromic medium 40 is a solution-phase type electrochromic medium, wherein a material contained in solution in an ionically conducting electrolyte remains in solution in the electrolyte when electrochemically reduced or oxidized (including a gel). In another non-limiting embodiment of the present invention, electrochromic medium 40 is a surface-confined electrochromic medium, wherein a material that is attached directly to an electronically conducting electrode or confined in close proximity thereto remains attached or confined when electrochemically reduced or oxidized. In still another non-limiting embodiment of the present invention, electrochromic medium 40 is an electrodeposition-type electrochromic medium 40, wherein a material contained in solution in the ionically conducting electrolyte forms a layer on the electronically conducting electrode when electrochemically reduced or oxidized.

Although not required, in one non-limiting embodiment, electrochromic medium 40 includes at least one anodic electrochromic compound and at least one cathodic electrochromic compound, with the anodic compound representing an oxidizable material and the cathodic compound representing a reducible material. Upon application of electrical potential to the electrochromic medium 40, the anodic electrochromic compound oxidizes and the cathodic electrochromic compound simultaneously reduces. Such simultaneous oxidation and reduction results in a change in the absorption coefficient of at least one wavelength in the visible spectrum. The combination of such anodic and cathodic electrochromic compounds in electrochromic medium 40 defines the color associated therewith upon application of an electrical potential. Such cathodic electrochromic compounds are commonly referred to as viologen dyes, and such anodic electrochromic compounds are commonly referred to as phenazine dyes.

Electrochromic medium 40 can also include other materials such as solvents, light absorbers (e.g. UV absorbers), light stabilizers, thermal stabilizers, antioxidants, thickeners, viscosity modifiers and similar materials.

Referring to FIG. 5, one particular non-limiting embodiment of the present invention is shown. The first substrate 20 is provided with a primer layer 22 on facing major surface 21 and the second substrate 30 is provided with a primer layer 22' on major surface 31 (hereinafter also referred to as "first primer layer 22" and "second primer layer 22'"). The first substrate 20 and the second substrate 30 are preferably plastic and have a thickness ranging from 0.02 inch to 2 inches, such as 0.08 inch to 1 inch. In one non-limiting embodiment, the first and second primer layers 22, 22' are made of an epoxy silane, e.g. a bis phenyl A epoxy, and have a lower coefficient of expansion than the corresponding first substrate 20 and the second substrate 30, respectively. Because the window assembly is continuously expanding and/or contracting when in operation due to changes in pressure and/or temperature, the first and second primer layers 22, 22' help reduce the stress between the substrates 20, 30 and the coatings 29, 39 to help prevent delamination of the coatings. The first and second primer layers 22, 22' can also include light absorbers, e.g. UV absorbers in order to reduce UV impingement damage of the window assembly. Although not required, each of the primer layers 22, 22' can be applied to the facing major surfaces 21 and 31 by the flow coating method known to one of ordinary skill in the art. Once applied, the first and second primer layers 22, 22' are heat cured for approximately 1 to 5 hours in a vacuum chamber. In one non-limiting embodiment, each of the primer layers 22, 22', which can have one or more films, is less than or equal to 25 microns thick.

Figure 6:
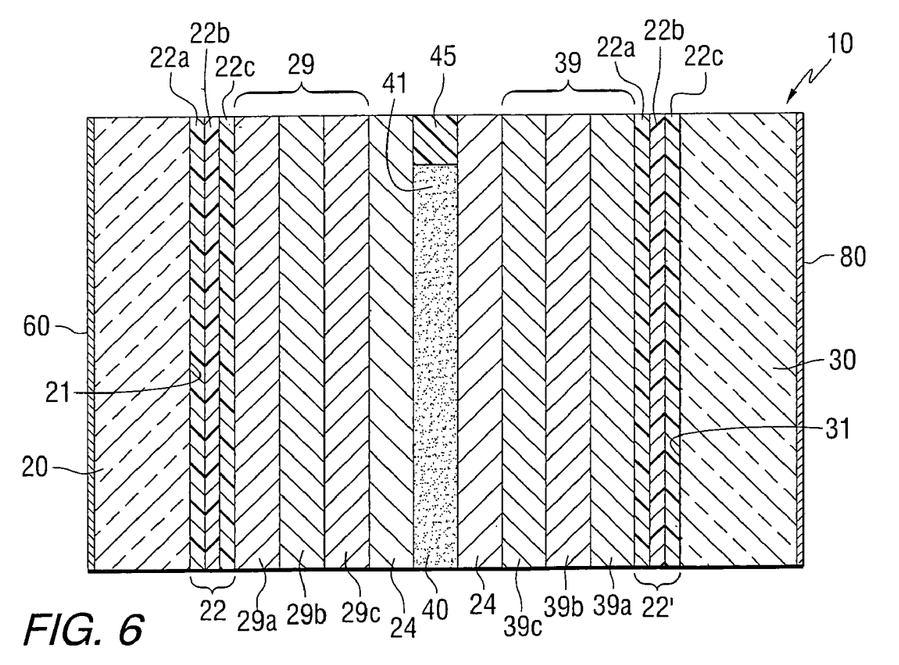
FIG. 6 is a sectional view, similar to FIG. 5, of an alternate embodiment of an electrochromic window assembly, wherein the primer layer comprises multiple film layers.

Referring to FIG. 6, one particular non-limiting embodiment of the present invention is shown, wherein the first and second primer layers 22, 22' include a gradient thermal expansion stack defined by a first film layer 22a, a second film layer 22b adjacent the first film layer 22a and a third film layer 22c adjacent the second film layer 22b. The third film layers 22c of the first and second primer layers 22, 22' are closest to the electrochromic medium 40. In one non-limiting embodiment, the coefficient of expansion of the first film layer 22a is less than that of the plastic substrate 20, 30. The coefficient of expansion of the second film layer 22b is less than that of the first film layer 22a, and the coefficient of expansion of the third film layer 22c is less than that of the second film layer 22b. In one non-limiting embodiment, each of the film layers 22a, 22b and 22c is made of an epoxy silane, e.g. a bis phenyl A epoxy, wherein the coefficient of expansion can be lowered by increasing the silane content of the epoxy silane film. The first film layer 22a, the second film layer 22b and the third film layer 22c can vary in thickness, either individually or uniformly. In one non-limiting embodiment, the total thickness of each of the first and second primer layers 22, 22' is less than or equal to 25 microns thick. As will be appreciated, the invention is not limited to a three film primer layer. The primer layers could alternatively include two primer films or four or more primer films. In a broad aspect of the invention, if multiple primer films are present, at least one of the primer films has a coefficient of expansion less than that of the substrate on which it is located. In another non-limiting embodiment, if only one primer film is present, the primer film has a coefficient of expansion less than that of the substrate on which if is located.

The first conductive coating 29 and the second conductive coating 39 are applied atop their respective primer layer 22, 22'. In one non-limiting embodiment, the first and second conductive coatings 29 and 39 are composed of an ITO/silver/ITO stack having a resistivity of 2 ohms per square, as shown in FIGS. 5 and 6. The first conductive coating 29 has a silver film 29b of less than or equal to 150 Å sandwiched between ITO films 29a and 29c. The second conductive coating 39 has a silver film 39a of less than 150 Å sandwiched between ITO films 39a and 39c. The ITO/silver/ITO stack of first and second coatings 29 and 39 can be repeated as a unit, e.g., from 1 to 6 times, as desired. In one non-limiting embodiment, three silver layers are present. Additionally, the ITO films 29a, 29c, 39a, 39c, can be replaced with a zinc oxide film, a doped or undoped conductive zinc stannate film, or both. An oxygen barrier layer 24, as shown in FIGS. 5 and 6, can be placed between the electrochromic medium chamber 41 and the first and second conductive coatings 29 and 39. However, as will be appreciated by one of ordinary skill in the art, the oxygen barrier layer 24 can be applied between the primer layers 22, 22' and each respective first and second conductive coating 29 and 39. The oxygen barrier layer 24 prevents oxidation of the dyes contained within the electrochromic medium 40. In one non-limiting embodiment, the electrochromic medium 40 is contained within the chamber 41, which on this non-limiting embodiment is approximately 0.02 inch wide. The electrochromic medium 40 contains from 95% to 98% propylene carbonate as a solvent for a combined $\frac{1}{10}$ weight % of viologen dye and dimethyl tetrafluroborate is present in the electrochromic medium 40 as a salt solution to promote conductivity. Further, from 2.0 weight % to 5.0 weight % of a polyurethane or polyurethane acrylate polymer is present in the electrochromic medium 40 to make a gel. In this non-limiting embodiment of the present invention, the viologen dye is a cathodic electrochromic compound and the dimethylphenazine dye is an anodic electrochromic compound. Upon application of electrical potential to the electrochromic medium 40, the dimethylphenazine dye oxidizes and the viologen dye simultaneously reduces. As discussed herein above, the simultaneous oxidation and reduction results in a change in the absorption coefficient of at least one wavelength in the visible spectrum. The combination of these anodic and cathodic electrochromic compounds in electrochromic medium 40 defines the color associated therewith upon application of an electrical potential. In this particular embodiment, the viologen dye changes to dark blue and the dimethylphenazine dye changes to light yellow. Thus, upon application of an electrical potential, the electrochromic medium 40 appears aquamarine in color. Further, the presence of the gel-forming polyurethane or polyurethane acrylate polymer prevents migration and segregation of the dyes. It will be readily appreciated by one of ordinary skill in the art that the dyes can be replaced by or added upon by other dyes to impart a different color or colors to the electrochromic medium 40. Further, an increase in electrical potential, such as an increase in voltage, darkens the color of electrochromic medium. Thus, when the electrochromic window assembly 10 is installed into an aircraft for example, the shading provided can be "personalized", i.e., a voltage or electrical potential can be increased or decreased to provide a light transmission of from 0.1% to 70% or more. A light transmission of 70% or more translates into a clear or bleached state of the electrochromic medium 40. The darker the electrochromic medium 40, the more the light transmission percentage decreases. Additionally, in this particular embodiment of the invention, if the electrical potential is terminated, such as via a power outage, the electrochromic window assembly 10 self-bleaches to a clear state. The amount of electrical potential can be adjusted by an end-user of the assembly 10 via push buttons or a dial assembly that controls the amount of current directed to the assembly 10.

Although not required, in one non-limiting embodiment of the invention, at least one edge of coating 29 and/or 39 extends at least in close proximity to an edge of the substrate 20 and/or 30, respectively, i.e. to the perimeter edge 11 of assembly 10, e.g. within 2 inches, or 1 inch or 0.5 inches (5.08 cm, or 2.54 cm or 1.27 cm) of the perimeter edge 11. In the particular non-limiting embodiment of the invention shown in FIGS. 1-6, all the edges of coatings 29 and 39 extend at least in close proximity to the perimeter edge 11 of assembly 10, and in one non-limiting embodiment, all the edges of coating 29 and 39 extend to the edge of their corresponding substrate and thus to the perimeter edge 11 of assembly 10.

Figure 4:
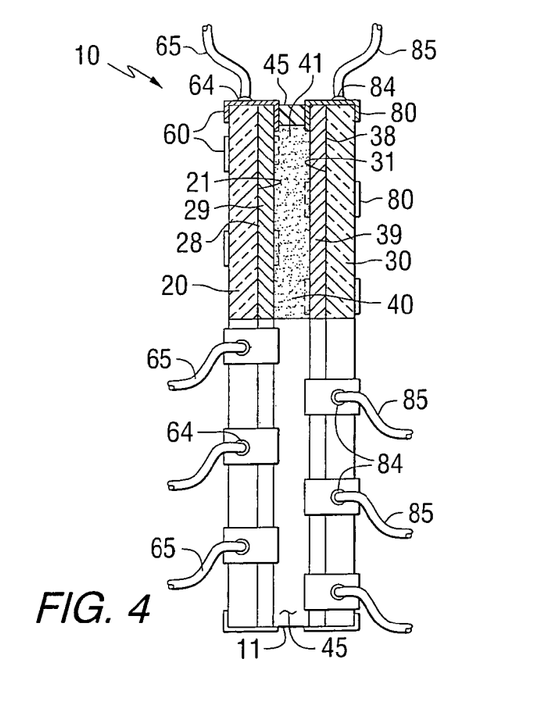
FIG. 4 is a sectional view, similar to FIG. 3, of an alternate embodiment of an electrochromic window assembly having segmented bus bars.

As shown in FIGS. 1-6, in one non-limiting embodiment, a plurality of first facilities contacts first conductive coating 29, and a plurality of second facilities contact second conductive coating 39. In one non-limiting embodiment of the present invention, the plurality of first facilities comprises a plurality of bus bars 60, and the plurality of second facilities comprises a plurality of bus bars 80. Without limiting the present invention, in one particular embodiment, bus bars 60 are anodic bus bars while bus bars 80 are cathodic bus bars. Such bus bars 60 and 80 provide electrical connection between a DC power source (not shown in FIGS. 1-7) and first and second conductive coatings 29 and 39, respectively. Such electrical connection can be established in any known manner. For example, as shown in FIGS. 3 and 4, each of anodic bus bars 60 can be connected to an anodic conductive wire 65 by solder joint 64, while each of cathodic bus bars 80 can be connected to a cathodic conductive wire 85 by solder joint 84. In this manner, a positive current is applied to the anodic bus bars 60 and coating 29 and a negative current is applied to the cathodic bus bars 80 and coating 39, producing an electrical potential between the coatings within the electrochromic cell. Further, an external cover or insulator (not shown) can be provided about the perimeter edge 11 of electrochromic window assembly 10 to protect spacing assemblies 45, wires 65 and 85 and/or joints 64 and 84. In another non-limiting embodiment, a single bus bar could be connected to the first conductive coating 29 and another single bus bar could be connected to the second conductive coating 39.

In the one particular non-limiting embodiment of the invention shown in FIGS. 1-6, the edges of coating 29 extend to the perimeter edge 11 of assembly 10 and anodic bus bars 60, which are in contact with first conductive coating 29, are provided along opposing ends 20*b* and 20*d* of first substrate 20. In this manner, electrical current from the power source is provided to the opposing edges of the first conductive coating 29 along opposing ends 20*b* and 20*d* of first substrate 20. Similarly, the edges of coating 39 extend to the perimeter edge 11 of assembly 10 and cathodic bus bars 80, which are in contact with second conductive coating 39, are provided along opposing ends 30*b* and 30*d* of second substrate 30. In this manner, electrical current from the power source is provided to the opposing edges of the second conductive coating 39 along opposing ends 30*b* and 30*d* of second substrate 30. Bus bars 60 can alternatively or simultaneously be provided along opposing ends 20*a* and 20*c* of first substrate 20 and bus bars 80 can alternatively or simultaneously be provided along opposing ends 30*a* and 30*c* of second substrate 30.

In nonlimiting embodiment of the invention similar to that shown in FIGS. 1-6, the edges of coating 29 extend to the perimeter edge 11 of assembly 10 and anodic bus bars 60, which are in contact with first conductive coating 29, are provided along opposing ends 20*a* and 20*c* of first substrate 20. In this manner, electrical current from the power source is provided to the opposing edges of the first conductive coating 29 along opposing ends 20*a* and 20*c* of first substrate 20. Similarly, the edges of coating 39 extend to the perimeter edge 11 of assembly 10 and cathodic bus bars 80, which are in contact with second conductive coating 39, are provided along opposing ends 30*b* and 30*d* of second substrate 30. In this manner, electrical current from the power source is provided to the opposing edges of the second conductive coating 39 along opposing ends 30*b* and 30*d* of second substrate 30. Furthermore, these opposing ends of first and second coatings 29 and 39 to which the electrical current is applied are spaced from each other. Without wishing to be bound by any particular theory, it is believed that by applying the current to opposite ends of the coatings and spacing the ends of a first coating that are energized with a positive current from the ends of a second coating that are energized by a negative current results in a uniform application of electrical potential throughout the entire electrochromic cell, resulting in uniform coloring of the electrochromic medium and reducing the iris effect (progressive coloration from the edge of the cell towards its center). As used herein, the term "uniform coloring" means that those portions of the electrochromic medium that change color due to the applied electrical potential, all change generally in the same manner, e.g. generally at the same time and/or generally at the same rate.

In another non-limiting embodiment of the present invention, bus bars 60 are arranged along opposing edges 20*a* and 20*c* as well as along opposing edges 20*b* and 20*d*, and bus bars 80 are arranged along opposing edges 30*b* and 30*d* as well as along opposing edges 30*a* and 30*c*. In this manner, the anodic bus bars 60 are provided about the perimeter of the entire first substrate 20 and the cathodic bus bars 80 are provided about the perimeter of the entire second substrate 30, i.e. bus bars 60 and 80 are positioned about the entire perimeter edge 11 of assembly 10. In one particular non-limiting embodiment shown in FIG. 4, bus bars 60 and bus bars 80 are arranged in alternating fashion, i.e. each bus bar 60 is arranged between each bus bar 80 about the perimeter edge 11 of window assembly 10. Such an arrangement provides uniform application of electrical potential through the entire electrochromic window assembly 10. Although not required, in one non-limiting embodiment of the invention, each anodic bus bar 60 is spaced from each cathodic bus bar 80 along the perimeter edge 11 of the window assembly 10 a distance of at least 0.5 inches (1.27 cm). Such spacing ensures that the current between the bus bars will not short and provides uniform electrical potential through the entire electrochromic device. In addition, this bus bar configuration provides that even under prolonged application of an electrical potential, dye segregation is minimized. Dye segregation is the tendency of the dyes to migrate toward and concentrate at the portion of the assembly where the electrical power is the greatest, typically along the bus bars.

Bus bars 60 and 80 can be made of any highly conductive material typically used for bus bars and well known in the art. Non-limiting examples of typical bus bar materials include metal foil, e.g. copper foil, metal coating, e.g. gold coatings, and conductive metal containing ceramic paints, e.g. silver ceramic paint.

The size and shape of bus bars 60 and 80 can be tailored to the particular geometry of the electrochromic window assembly. In one non-limiting embodiment of the present invention, each of bus bars 60 and 80 are at least 0.5 inches (1.27 cm) in length. Further, the bus bars 60 and 80 can be the length of the entire edge of the substrates 20 and 30.

As indicated, electrochromic medium 40 is capable of changing its color and thus its light transmittance when an electrical potential is applied through the medium. Application of the electrical potential can be selective, i.e. the electrochromic window assembly is switchable between one level of transmittance, when no electrical potential is applied, and a second level of transmittance, when electrical potential is applied to change the color of the dyes and reduce the luminous transmittance of the electrochromic medium 40. This feature is most easily accomplished by providing a switch for selectively applying electrical current to the window assembly.

In one non-limiting embodiment of the present invention, the coloring of the electrochromic medium between the energized and non-energized electrical states is self-erasable, i.e. the coloring of the electrochromic medium when in an electrochemically activated state upon application of an electrical potential, automatically returns or erases to its original state, e.g. colorless state, when the electrical potential is removed. It should be appreciated that the original state can be a colorless state or it can have a color or tint.

In a further non-limiting embodiment, the electrochromic window assembly is switchable and non-self-erasing, i.e. application of the electrical potential causes the electrochromic medium to color, and the electrochromic medium will remain in the colored state until the electrical potential is reversed or shorted.

Moreover, the color of the dye can be of a constant darkness or shade upon application of an electrical potential, or it can be of varying degrees of darkness or shading depending upon the magnitude of the electrical potential established through the electrochromic medium. For example and without limiting the present invention, specific coloring or shading of the coloring can be varied over a range of voltages and power densities. Upon application of a low power density to the electrochromic medium, the dye can begin to color. Increasing the voltage can cause the color of the dye to darken to a deeper shade or intensity. In this manner, the window assembly can include varying degrees of light transmittance upon varying of the electrical potential. The window assembly can, therefore, be adjusted to a desired level of darkness or shading based upon the amount of electrical potential applied thereto. This can be easily accomplished, for example, by incorporating a switch or some other control between the electrical power source and the window assembly, as discussed earlier and will be discussed later in more detail. Although not required, in one non-limiting embodiment of the present invention, the electrochromic window assembly is switchable between a minimum LTA value ranging from 1 to 20 percent and a maximum LTA value ranging from 60 to 70 percent. As such, the electrochromic window assembly can effectively function as an opaque shade for a window, e.g., an automotive or aircraft transparency, when desired.

The amount of current applied to the electrochromic window assembly can be selected based on the specific assembly and the specific electrochromic medium used. In one non-limiting embodiment of the invention, the amount of current applied ranges from 0.4 volts to 1.2 volts, e.g. from 0.5 volts to 1.0 volts.

Figure 7:
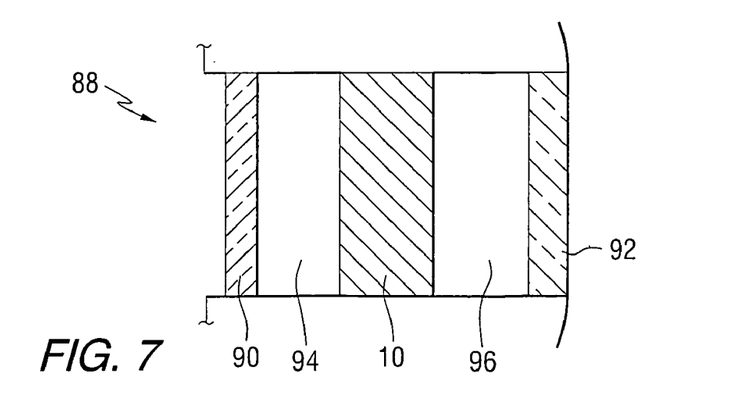
FIG. 7 is a sectional view of a further alternate embodiment of an electrochromic window assembly having a dust cover.

As shown in FIG. 7, another non-limiting embodiment of the present invention is shown. The electrochromic window assembly 10 is incorporated into an aircraft window assembly 88, which comprises a dust cover 90, the electrochromic window assembly 10 and a cabin window 92. The dust cover 90 is provided on the interior side of the aircraft window assembly 88 and is separated from electrochromic window assembly 10 by a space 94. The dust cover 90 is intended to protect the electrochromic window assembly 10 from physical contact by dust and other air particulates, as well as from touching of the electrochromic window assembly 10 by humans. The dust cover 90 is made of plastic or glass material. In one non-limiting embodiment, the dust cover 90 is made of Lexan® plastic. The cabin window 92 is provided on the exterior of the aircraft window assembly 88 and is separated from electrochromic window assembly 10 by a space 96. Cabin window 92 seals the window opening in the aircraft.

Use of the electrochromic window assembly will now be described, with specific reference to FIG. 3 as exemplary of the present invention. Electrochromic window assembly provided as described above, is a generally transparent assembly when no electrical potential is applied thereto. As such, electrochromic window assembly 10 is in the lightened state and high light transmittance is possible. When darkening of the window assembly is desired, the electrochromic window assembly is activated, for example by a switch that is activatable by the user. Activation of the switch causes the power source to supply current to bus bars 60 and 80 in any convenient manner, e.g. through the wire leads attached thereto, and to first and second conductive coatings 29 and 39. Such current causes an application of electrical potential across the electrochromic medium, which in turn causes the at least one anodic electrochromic compound to oxidize and the at least one cathodic electrochemical compound to reduce. This reaction results in a change in color of the electrochromic medium such that the electrochromic medium begins to absorb light and darken. Since the electrical potential between coatings 29 and 39 is applied through the bus bar arrangement as set forth above, the coloring of the electrochromic medium is rapid and uniform throughout the entire electrochromic window assembly.

Deactivation of the assembly 10 causes the supply of power to be interrupted to bus bars 60 and 80. As such, the potential being applied across electrochromic medium 40 is removed. Such deactivation can be affected using the same switch arrangement as discussed above to activate the assembly 10. As discussed earlier, in the case of a self-erasing electrochromic medium, the window assembly 10 will return to its original state. In the case of a non-self-erasing electrochromic medium, the color will remain until the electrical potential through the medium is reversed.

In a further embodiment of the present invention, only a portion of the electrochromic window assembly can be colored to establish a partially shaded window. Such partial shading can be achieved by selectively applying current to a selected number of the anodic bus bars 60 and cathodic bus bars 80, thereby creating the electrical potential through only a portion of the electrochromic window assembly. Such preferential area shading can be accomplished, for example, by applying current selectively to certain predetermined anodic and cathodic bus bars 60 and 80. Such selective application of current establishes an electrical potential at only a selected portion of electrochromic window assembly 10. As such, only a portion of the electrochromic medium between these areas of current application will change color, resulting in a partially shaded assembly, i.e. the luminous transmittance through the portion of the electrochromic medium through which an electrical potential is established by the energized portions of the coatings (due to selective powering of the bus bars) will change as compared to those portions of the electrochromic medium that are not between the energized portions of the coatings and not subjected to an electrical potential.

It is noted that prolonged application of electrical current to a selected number of facilities in this manner can result in "bleeding" of the electrochromic medium, in which the electrochromic medium in the areas of the electrochromic window assembly to which electrical current is not applied gradually begins to color to a darkened state. This is believed to be due to the current flowing through the entire conductive layer even though the electrical current is only applied to a portion of the conductive layer, thus enlarging the area of the electrochromic medium through which the electrical potential is applied. The amount of bleeding is based on the specific sheet resistance of the conductive coatings. For example, incorporating conductive coatings having a higher sheet resistance will reduce this bleeding effect somewhat. Increased sheet resistance will, however, consume more power to switch the color of the device, and will take a longer period of time to achieve full coloring and switching of the device.

In order to avoid this bleeding effect, particularly with low sheet resistance conductive coatings, it is possible to ground or short the current at the facilities that are not selected for application of electrical current to create the shaded area. For example, the partially shaded window assembly can be achieved by selectively applying current to selected anodic bus bars 60 and selected cathodic bus bars 80. By grounding or shorting the current at the remaining bus bars, no electrical potential is applied to that part of the window assembly 10. Thus, the color of electrochromic medium 40 at the remaining portion of assembly 10 is generally maintained in a lightened state, and any bleeding effect of coloring from the top portion, which is colored due to application of electrical potential, is reduced.

Still further, the electrochromic window assembly can include a gradient shading across the surface thereof, such that electrochromic window assembly gradually changes from a lightened state, through successively darker shaded sections to a darkened state. This can be accomplished in a similar manner as described above with respect to the preferentially shaded area, by applying varying voltages to different facilities in order to achieve varying degrees of darkening of the electrochromic medium. As such, electrochromic window assembly 10 can be gradually shaded from a darkened state at the top portion, through a slightly darkened state at the middle portion to a lightened state at the bottom portion.

In another non-limiting embodiment of the present invention, it is possible to achieve a gradient shading across the electrochromic window assembly, such that a portion of the electrochromic window assembly is fully colored, while a separate portion of the electrochromic window assembly is only partially colored. As such, electrochromic window assembly 10 will include a gradient shading from a completely darkened state at the top portion, through a slightly darkened state at the bottom portion.

It should be appreciated that due to the multiple anodic and cathodic bus bars positioned about the perimeter edge 11 of window assembly 10 as shown in FIG. 4 and discussed in detail above, this embodiment can also be operated in a manner that darkens one or more selected portions of assembly 10 and/or produces a gradient shading in one or more selected portions of assembly 10.

In order to control the darkening pattern of the electrochromic window assemblies of the types disclosed herein, a controller (not shown) can be used to control power distribution to the conductive coatings. A controller can be used to control the electrical power supplied to each bus bar in assembly 10 by a DC power source. More particularly, the controller can control whether a particular bus bar is energized (i.e. current is delivered to the bus bar), not energized or shorted. In addition, the controller can control how much current is delivered to the particular bus bar. By controlling where and how much current should be supplied to the coatings, the controller can establish an electrical potential through only a selected portion of the electrochromic medium such that its luminous transmittance through the selected portion is different from its luminous transmittance through its other portions. As a result, the controller can be used to produce a desired change in the luminous transmittance of the assembly, such as but not limited to, darkening a selected portion of the assembly or providing a gradient shading as discussed earlier. The controller can also control the current as required to account for non-symmetrical features of the assembly, e.g. shape, bus bar length, coating thickness, etc.

Multiple embodiments of the present invention have now been described. It will be appreciated that these embodiments are merely illustrative of the invention. Many variations and modifications of the invention will be apparent to those skilled in the art are intended to be included within the scope of the following claims.

The invention claimed is:

1. An electrochromic window comprising:
   a first transparent substrate having a first electrically-conductive coating over at least a portion thereof;
   a second transparent plastic substrate having a second electrically-conductive coating over at least a portion thereof, wherein the second electrically-conductive coating comprises a metal layer located between first and second metal oxide layers; and
   an electrochromic medium located between the first and second electrically-conductive coatings,
   wherein the second substrate includes a primer layer located between the second substrate and the second electrically-conductive coating.

2. The electrochromic window of claim 1, wherein both substrates are plastic.

3. The electrochromic window of claim 2, wherein said first and second transparent plastic substrates are selected from the group consisting of polycarbonate, acrylic and urethane plastics.

4. The electrochromic window of claim 1, wherein each substrate has a primer layer positioned between the substrate and the electrically conductive coating.

5. The electrochromic window of claim 1, wherein the metal layer comprises silver.

6. The electrochromic window of claim 1, wherein at least one of the first and second metal oxide layers comprises indium tin oxide.

7. The electrochromic window of claim 1, wherein the primer layer comprises a multi-layer primer structure.

8. The electrochromic window of claim 7, wherein the primer layer comprises at least two film layers, each film layer having a coefficient of expansion less than a coefficient of expansion of the second substrate.

9. The electrochromic window of claim 7, wherein the primer layer comprises a first film, a second film adjacent said first film, and a third film adjacent said second film, wherein said third film is closest to said electrochromic medium, said first film has a coefficient of expansion less than the coefficient of expansion of the second substrate, said second film has a coefficient of expansion less than said first film, and said third film has a coefficient of expansion less than or equal to said second film.

10. The electrochromic window of claim 1, including a primer layer located between the first substrate and the first conductive coating.

11. The electrochromic window of claim 10, wherein at least one of said primers layers comprises an epoxy silane.

12. The electrochromic window of claim 11, wherein said epoxy silane is bis phenyl A epoxy.

13. The electrochromic window of claim 1, wherein said electrochromic medium contains a viologen dye and a dimethylphenazine dye.

14. The electrochromic window of claim 1, wherein said electrochromic medium contains at least one of a polyurethane polymer or a polyurethane acrylate polymer.

15. The electrochromic window claim 1, wherein said electrochromic medium comprises tetrabutyl ammonium tetrafluoroborate.

16. The electrochromic window of claim 1, wherein an oxygen barrier layer is positioned between the electrochromic medium and at least one substrate.

17. The electrochromic window of claim 1, wherein said electrochromic medium comprises at least one anodic electrochromic compound and at least one cathodic electrochromic compound, and application of electrical potential to said electrochromic medium causes simultaneous oxidation of said anodic electrochromic compound and reduction of said cathodic electrochromic compound, thereby causing reduced luminous transmittance.

18. The electrochromic window of claim 1, wherein the window is selected from aircraft cabin windows and aircraft cockpit windows.

19. The electrochromic window of claim 1, further comprising:
- a plurality of first spaced facilities contacting said first conductive coating and capable of delivering electrical current to said first conductive coating;
- a plurality of second spaced facilities contacting said second conductive coating and capable of delivering electrical current to said second conductive coating to establish said electrical potential through said electrochromic medium;
- a first plurality of connectors, each one of the first plurality of connectors connected to a corresponding one of the plurality of first spaced facilities to deliver electrical current to the at least corresponding one of the plurality of first spaced facilities; and
- a second plurality of connectors, each one of the second plurality of connectors connected to a corresponding one of the plurality of second spaced facilities to deliver electrical current to the at least corresponding one of the plurality of second spaced facilities.

20. The electrochromic window of claim 19, wherein said plurality of first spaced facilities contact said first conductive coating along opposing ends thereof, and said plurality of second spaced facilities contact said second conductive coating at least along opposing ends thereof.

21. The electrochromic window of claim 20, wherein said opposing ends of said first conductive coating and said opposing ends of said second conductive coating are spaced from each other.

22. The electrochromic window of claim 1, further comprising a dust cover spaced apart from the window in an interior position of an aircraft.

23. An electrochromic window comprising:
- a first transparent plastic substrate having a first primer layer over at least a portion thereof and a first electrically-conductive coating over at least a portion of said first primer layer, said first primer layer comprising a multi-film coating comprising at least a first primer film overlaying at least a portion of the first substrate and having a coefficient of expansion less than that of the first substrate, and a second primer film overlaying at least a portion of the first primer film of the first primer layer and having a coefficient of expansion less than that of the first primer film of the first primer layer;
- a second transparent plastic substrate having a second primer layer over at least a portion thereof and a second electrically-conductive coating over at least a portion of said second primer layer, said second primer layer comprising a multi-film coating comprising at least a first primer film overlaying at least a portion of the second substrate and having a coefficient of expansion less than that of the second substrate, and a second primer film overlaying at least a portion of the first primer film of the second primer layer and having a coefficient of expansion less than that of the first primer film of the second primer layer; and
- an electrochromic medium located between the first and second conductive coatings.

24. The electrochromic window of claim 23, wherein the first and second primer layers each further comprise a third primer film having a coefficient of expansion less than that of an adjacent second primer film.

25. The electrochromic window of claim 23, wherein the electrically conductive coatings comprise at least one metallic silver layer.

* * * * *